US012659624B2

(12) United States Patent
Tsuboi et al.

(10) Patent No.: US 12,659,624 B2
(45) Date of Patent: Jun. 16, 2026

(54) PHOTOELECTRIC CONVERSION DEVICE

(71) Applicant: CANON KABUSHIKI KAISHA, Tokyo (JP)

(72) Inventors: Toshiki Tsuboi, Tokyo (JP); Yu Maehashi, Hokkaido (JP)

(73) Assignee: CANON KAUBUSHIKI KAISHA, Tokyo (JP)

( * ) Notice: Subject to any disclaimer, the term of this patent is extended or adjusted under 35 U.S.C. 154(b) by 86 days.

(21) Appl. No.: 18/675,563

(22) Filed: May 28, 2024

(65) Prior Publication Data

US 2025/0024178 A1 Jan. 16, 2025

(30) Foreign Application Priority Data

Jul. 11, 2023 (JP) ................................. 2023-113641

(51) Int. Cl.
| | |
|---|---|
| *H04N 25/773* | (2023.01) |
| *H04N 23/56* | (2023.01) |
| *H04N 25/705* | (2023.01) |
| *H04N 25/76* | (2023.01) |
| *H04N 25/767* | (2023.01) |
| *H04N 25/771* | (2023.01) |

(52) U.S. Cl.
CPC ........... *H04N 25/773* (2023.01); *H04N 23/56* (2023.01); *H04N 25/705* (2023.01); *H04N 25/767* (2023.01); *H04N 25/771* (2023.01); *H04N 25/7795* (2023.01)

(58) Field of Classification Search
CPC ... H04N 25/767; H04N 25/773; G01S 17/894
See application file for complete search history.

(56) References Cited

U.S. PATENT DOCUMENTS

| | | | |
|---|---|---|---|
| 8,598,901 | B2 | 12/2013 | Hiyama |
| 8,711,259 | B2 | 4/2014 | Maehashi |
| 9,407,847 | B2 | 8/2016 | Maehashi |
| 9,762,840 | B2 | 9/2017 | Yamazaki |
| 9,986,194 | B2 | 5/2018 | Maehashi |
| 10,971,539 | B2 | 4/2021 | Maehashi |
| 11,057,551 | B2 | 7/2021 | Nishide |

(Continued)

FOREIGN PATENT DOCUMENTS

JP        H07-27859 A        1/1995

OTHER PUBLICATIONS

U.S. Appl. No. 18/768,967, filed Jul. 10, 2024 by Yu Maehashi.
U.S. Appl. No. 18/814,829, filed Aug. 26, 2024 by Tomoya Sasago.

*Primary Examiner* — Thanh Luu
(74) *Attorney, Agent, or Firm* — VENABLE LLP

(57) ABSTRACT

A photoelectric conversion device includes: a photon detection element configured to generate a light reception pulse signal according to incident light; a control unit configured to control a light emission pulse pattern of a light source, a light emission timing of the light source, and a gating period with respect to the light emission timing; a gating unit configured to output a light reception pulse pattern of the incident light based on the light reception pulse signal that is input in the gating period; and a pattern detection unit configured to compare the light reception pulse pattern with the light emission pulse pattern to output a signal according to a comparison result. A length of the gating period is equal to or greater than a length of a duration of the light emission pulse pattern.

18 Claims, 14 Drawing Sheets

(56)  References Cited

U.S. PATENT DOCUMENTS

| 11,240,453 | B2 | | 2/2022 | Maehashi | |
| 11,706,518 | B2 | | 7/2023 | Nishide | |
| 11,943,527 | B2 | | 3/2024 | Nishide | |
| 2015/0131080 | A1 | * | 5/2015 | Retterath | G01S 17/89 |
| | | | | | 356/5.01 |
| 2017/0052065 | A1 | | 2/2017 | Sharma | |
| 2020/0025924 | A1 | | 1/2020 | Aotake | |
| 2020/0072977 | A1 | | 3/2020 | Shoji | |
| 2023/0115792 | A1 | | 4/2023 | Maehashi | |
| 2024/0088186 | A1 | | 3/2024 | Shirahige | |
| 2024/0196080 | A1 | | 6/2024 | Nishide | |
| 2024/0210534 | A1 | | 6/2024 | Iida | |

* cited by examiner

FIG. 4

FIG. 6A
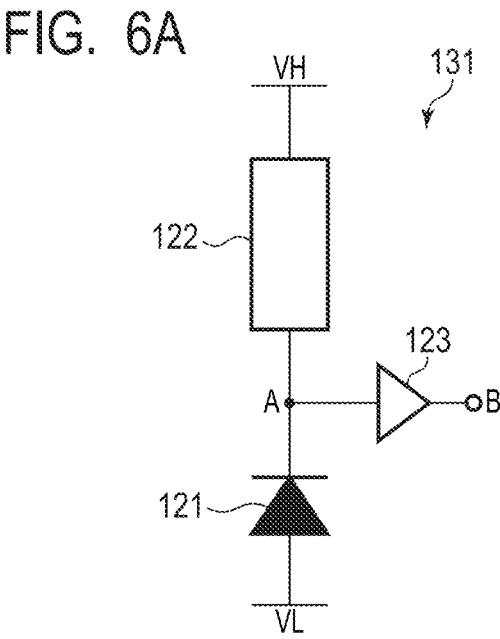
FIG. 6B
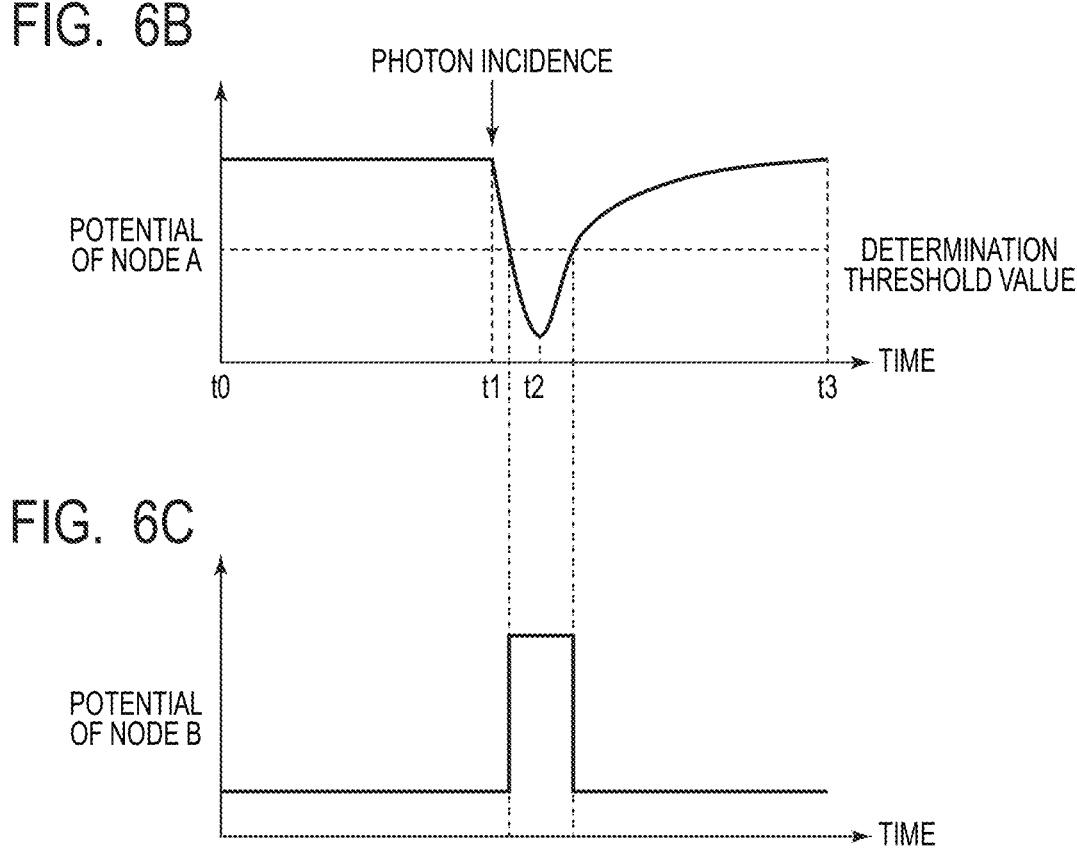
FIG. 6C

PHOTOELECTRIC CONVERSION DEVICE

BACKGROUND

Field

The present invention relates to a photoelectric conversion device.

Description of the Related Art

U.S. Patent Application Publication No. 2017/0052065 discloses a ranging device that measures a distance to an object by emitting light from a light source and receiving light including reflected light from the object by a light receiving element. U.S. Patent Application Publication No. 2017/0052065 discloses a method of repeatedly performing measurement while changing a gating period during which a photon is detected in a light receiving element.

In the ranging method disclosed in U.S. Patent Application Publication No. 2017/0052065, not only light emitted from a light source corresponding to the ranging device but also light emitted from other light sources may enter a light receiving element.

SUMMARY

An object of the present invention is to provide a photoelectric conversion device in which influence of light from light sources other than a corresponding light source is reduced.

According to a disclosure of the present specification, there is provided a photoelectric conversion device including: a photon detection element configured to generate a light reception pulse signal according to incident light; a control unit configured to control a light emission pulse pattern of a light source, a light emission timing of the light source, and a gating period with respect to the light emission timing; a gating unit configured to output a light reception pulse pattern of the incident light based on the light reception pulse signal that is input in the gating period; and a pattern detection unit configured to compare the light reception pulse pattern with the light emission pulse pattern to output a signal according to a comparison result. A length of the gating period is equal to or greater than a length of a duration of the light emission pulse pattern.

Further features of the present invention will become apparent from the following description of exemplary embodiments with reference to the attached drawings.

BRIEF DESCRIPTION OF THE DRAWINGS

FIG. 4 is a schematic block diagram illustrating a configuration example of a circuit substrate according to the first embodiment.

FIGS. 6A, 6B, and 6C are diagrams illustrating an operation of an avalanche photodiode according to the first embodiment.

FIG. 7 is a functional block diagram illustrating a schematic configuration example of the ranging device according to the first embodiment.

FIG. 10 is a pixel circuit diagram according to a second embodiment.

FIG. 13 is a pixel circuit diagram according to a third embodiment.

DESCRIPTION OF THE EMBODIMENTS

Figure 1:
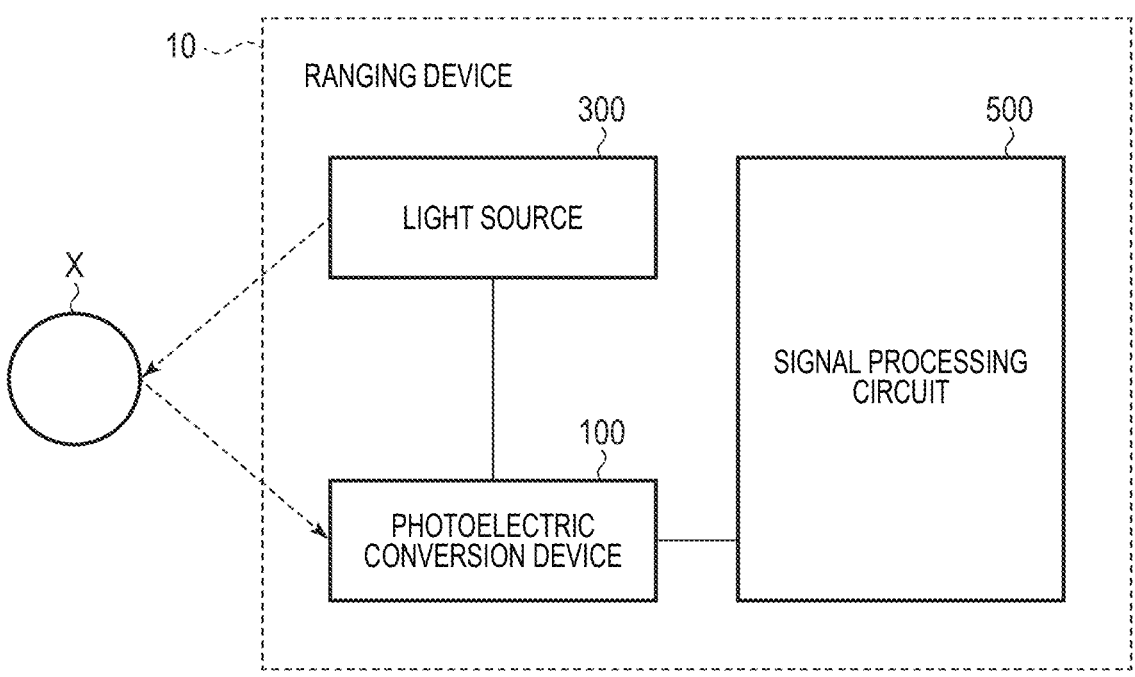
FIG. 1 is a hardware block diagram illustrating a schematic configuration example of a ranging device according to a first embodiment.

Embodiments of the present invention will now be described with reference to the accompanying drawings. In the drawings, the same or corresponding elements are denoted by the same reference numerals, and the description thereof may be omitted or simplified.

First Embodiment

FIG. 1 is a hardware block diagram illustrating a schematic configuration example of a ranging device 10 according to the present embodiment. The ranging device 10 includes a photoelectric conversion device 100, a light source 300, and a signal processing circuit 500. Note that the configuration of the ranging device 10 illustrated in the present embodiment is an example, and is not limited to the illustrated configuration.

The ranging device 10 measures a distance to an object X for the ranging by using a technology such as light detection and ranging (LiDAR). The ranging device 10 measures the distance from the ranging device 10 to the object X based on the time difference until the light emitted from the light source 300 and reflected by the object X is received by the photoelectric conversion device 100. In addition, the ranging device 10 can measure a plurality of points of distances two-dimensionally by emitting laser light to a predetermined ranging area including the object X and receiving reflected light by a pixel array. Thus, the ranging device 10 can generate and output a distance image.

The light received by the photoelectric conversion device 100 includes ambient light such as sunlight in addition to the reflected light from the object X. Therefore, the ranging device 10 may perform ranging by using a method of measuring the incident light in each of a plurality of periods (bin periods) and determining that the reflected light is incident in a period in which the light amount peaks for reducing the influence of ambient light.

The light source 300 is a device that emits light such as laser light to the outside of the ranging device 10. The light source 300 is, for example, a vertical cavity surface emitting laser (VCSEL). The signal processing circuit 500 may include a processor that performs arithmetic processing of digital signals, a memory that stores digital signals, and the like. The signal processing circuit 500 may be an integrated circuit such as a field-programmable gate array (FPGA), an image signal processor (ISP), or the like. The signal processing circuit 500 may be integrated with a semiconductor device constituting the photoelectric conversion device 100, or may be an external arithmetic device different from the semiconductor device.

The photoelectric conversion device 100 generates a pulse signal including a pulse based on the incident light. The photoelectric conversion device 100 includes, for example, an avalanche photodiode as a photoelectric conversion element. In this case, when one photon is incident on the avalanche photodiode and a charge is generated, one pulse is generated by avalanche multiplication. However, the photoelectric conversion device 100 may include, for example, a photoelectric conversion element using another photodiode.

In the present embodiment, the photoelectric conversion device 100 includes a pixel array in which a plurality of photoelectric conversion elements (pixels) are arranged to form a plurality of rows and a plurality of columns. Now, with reference to FIGS. 2 to 6C, a photoelectric conversion device that is a specific configuration example of the photoelectric conversion device 100 will be explained. The configuration example of the photoelectric conversion device described below is an example. The photoelectric conversion device applicable to the photoelectric conversion device 100 is not limited thereto, and may be any device as long as it can realize the functions of FIG. 7 described later.

Figure 2:
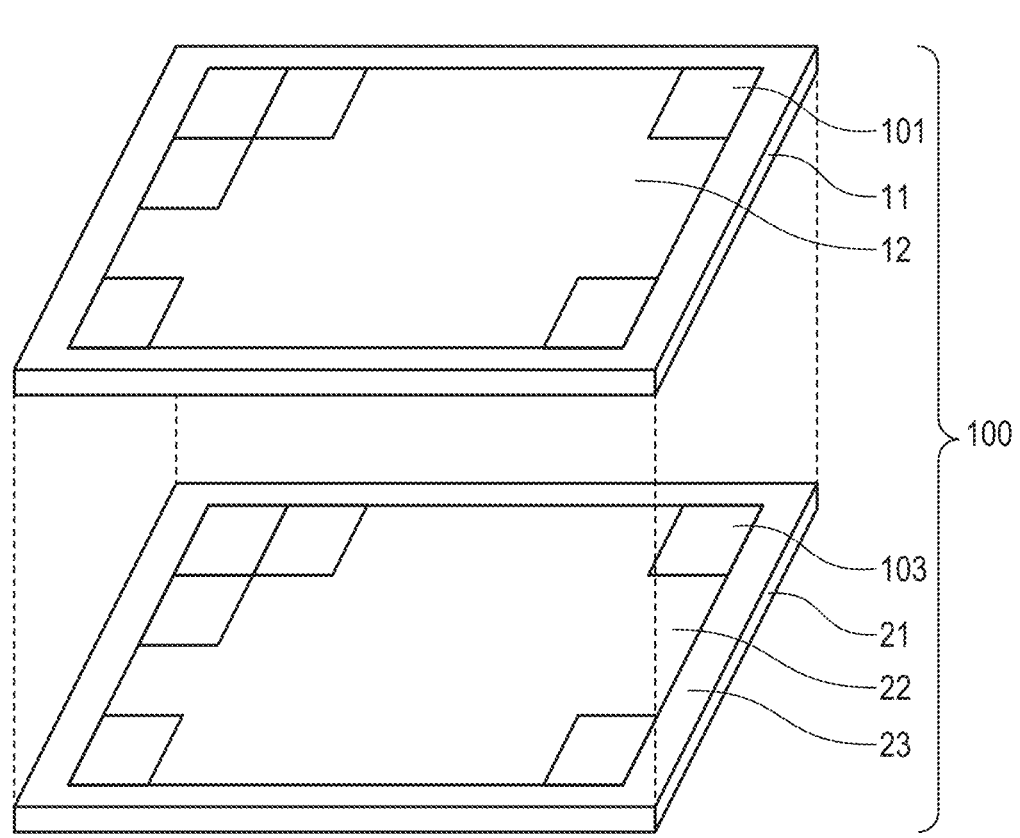
FIG. 2 is a schematic view illustrating an overall configuration of a photoelectric conversion device according to the first embodiment.

FIG. 2 is a schematic diagram illustrating an overall configuration of the photoelectric conversion device 100 according to the present embodiment. The photoelectric conversion device 100 includes a sensor substrate 11 (first substrate) and a circuit substrate 21 (second substrate) stacked on each other. The sensor substrate 11 and the circuit substrate 21 are electrically connected to each other. The sensor substrate 11 has a pixel region 12 in which a plurality of pixels 101 are arranged to form a plurality of rows and a plurality of columns. The circuit substrate 21 includes a first circuit region 22 in which a plurality of pixel signal processing units 103 are arranged to form a plurality of rows and a plurality of columns, and a second circuit region 23 arranged outside the first circuit region 22. The second circuit region 23 may include a circuit for controlling the plurality of pixel signal processing units 103. The sensor substrate 11 has a light incident surface for receiving incident light and a connection surface opposed to the light incident surface. The sensor substrate 11 is connected to the circuit substrate 21 on the connection surface side. That is, the photoelectric conversion device 100 is a so-called back-side illumination type.

In this specification, the term "plan view" refers to a view from a direction perpendicular to a surface opposite to the light incident surface. The cross section indicates a surface in a direction perpendicular to a surface opposite to the light incident surface of the sensor substrate 11. Although the light incident surface may be a rough surface when viewed microscopically, in this case, a plan view is defined with reference to the light incident surface when viewed macroscopically.

In the following description, the sensor substrate 11 and the circuit substrate 21 are diced chips, but the sensor substrate 11 and the circuit substrate 21 are not limited to chips. For example, the sensor substrate 11 and the circuit substrate 21 may be wafers. When the sensor substrate 11 and the circuit substrate 21 are diced chips, the photoelectric conversion device 100 may be manufactured by being diced after being stacked in a wafer state, or may be manufactured by being stacked after being diced.

Figure 3:
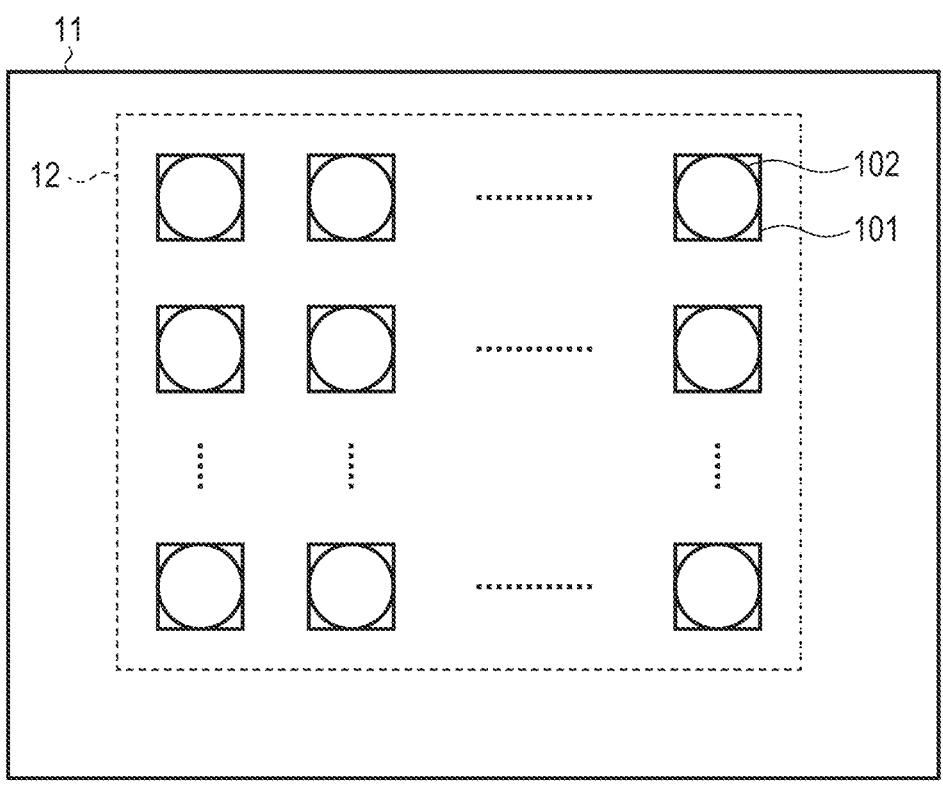
FIG. 3 is a schematic block diagram illustrating a configuration example of a sensor substrate according to the first embodiment.

FIG. 3 is a schematic block diagram illustrating an arrangement example of the sensor substrate 11. In the pixel region 12, a plurality of pixels 101 are arranged to form a plurality of rows and a plurality of columns. Each of the plurality of pixels 101 includes a photoelectric conversion unit 102 including an avalanche photodiode (hereinafter referred to as APD) as a photoelectric conversion element in the substrate.

Of the charge pairs generated in the APD, the conductivity type of the charge used as the signal charge is referred to as a first conductivity type. The first conductivity type refers to a conductivity type in which a charge having the same polarity as the signal charge is a majority carrier. Further, a conductivity type opposite to the first conductivity type, that is, a conductivity type in which a majority carrier is a charge having a polarity different from that of a signal charge is referred to as a second conductivity type. In the APD described below, the anode of the APD is set to a fixed potential, and a signal is extracted from the cathode of the APD. Accordingly, the semiconductor region of the first conductivity type is an N-type semiconductor region, and the semiconductor region of the second conductivity type is a P-type semiconductor region. Note that the cathode of the APD may have a fixed potential and a signal may be extracted from the anode of the APD. In this case, the semiconductor region of the first conductivity type is the P-type semiconductor region, and the semiconductor region of the second conductivity type is then N-type semiconductor region. Although the case where one node of the APD is set to a fixed potential is described below, potentials of both nodes may be varied.

Figure 4:
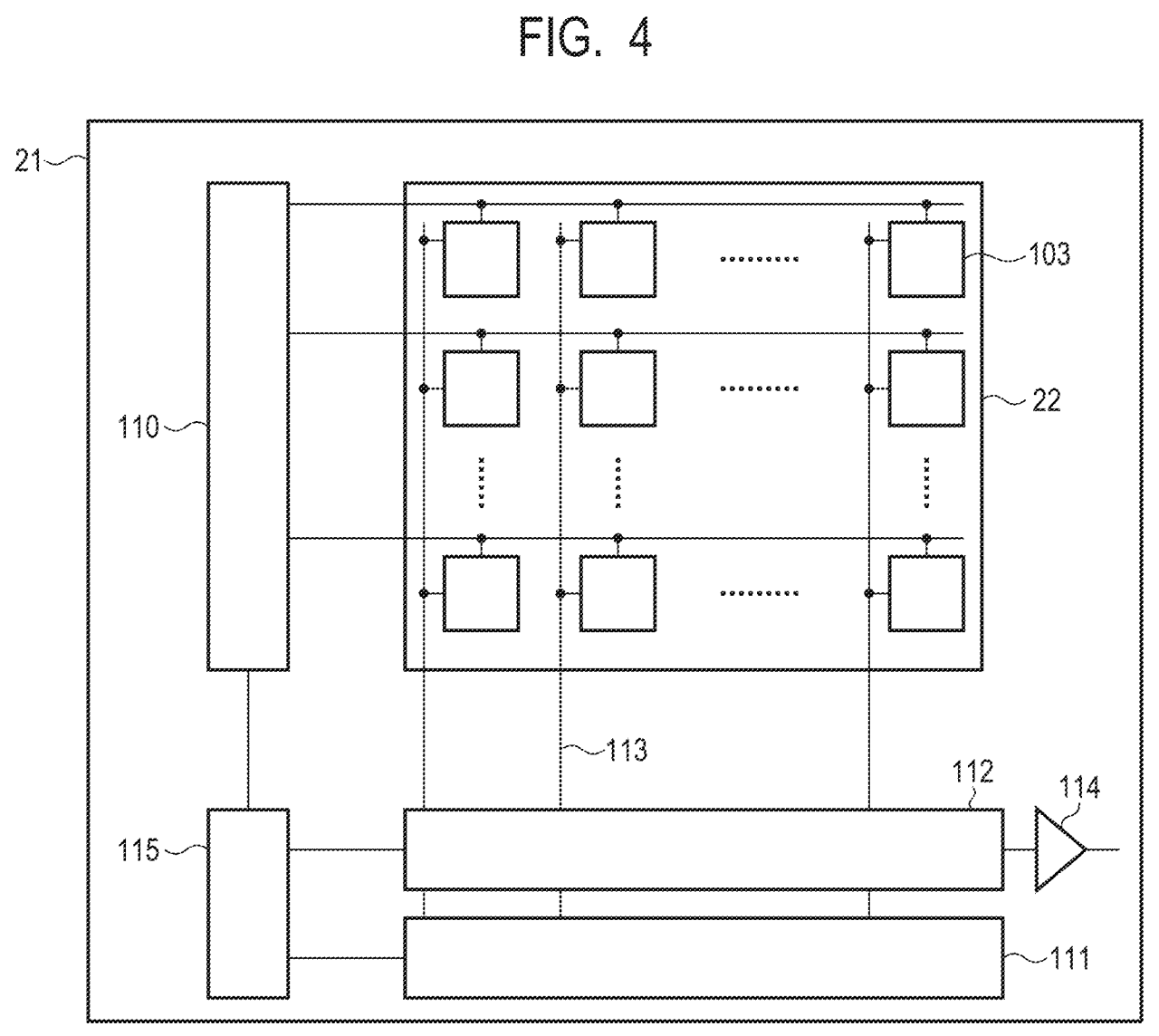

FIG. 4 is a schematic block diagram illustrating a configuration example of the circuit substrate 21. The circuit substrate 21 has the first circuit region 22 in which a plurality of pixel signal processing units 103 are arranged to form a plurality of rows and a plurality of columns.

The circuit substrate 21 includes a vertical scanning circuit 110, a horizontal scanning circuit 111, a reading circuit 112, a pixel output signal line 113, an output circuit 114, and a control signal generation unit 115. The plurality of photoelectric conversion units 102 illustrated in FIG. 3 and the plurality of pixel signal processing units 103 illustrated in FIG. 4 are electrically connected to each other via connection wirings provided for each pixels 101.

The control signal generation unit 115 is a control circuit that generates control signals for driving the vertical scanning circuit 110, the horizontal scanning circuit 111, and the reading circuit 112, and supplies the control signals to these units. As a result, the control signal generation unit 115 controls the driving timings and the like of each unit.

The vertical scanning circuit 110 supplies control signals to each of the plurality of pixel signal processing units 103 based on the control signal supplied from the control signal generation unit 115. The vertical scanning circuit 110 supplies control signals for each row to the pixel signal processing unit 103 via a driving line provided for each row of the first circuit region 22. As will be described later, a plurality of driving lines may be provided for each row. A logic circuit such as a shift register or an address decoder can be used for the vertical scanning circuit 110. Thus, the vertical scanning circuit 110 selects a row to be output a signal from the pixel signal processing unit 103.

The signal output from the photoelectric conversion unit 102 of the pixel 101 is processed by the pixel signal processing unit 103. The pixel signal processing unit 103 acquires and holds a digital signal based on a pulse output from the APD included in the photoelectric conversion unit 102.

It is not always necessary to provide one pixel signal processing unit 103 for each of the pixels 101. For example, one pixel signal processing unit 103 may be shared by a plurality of pixels 101. In this case, the pixel signal processing unit 103 sequentially processes the signals output from the photoelectric conversion units 102, thereby providing the function of signal processing to each pixel 101.

The horizontal scanning circuit 111 supplies control signals to the reading circuit 112 based on a control signal supplied from the control signal generation unit 115. The pixel signal processing unit 103 is connected to the reading circuit 112 via a pixel output signal line 113 provided for each column of the first circuit region 22. The pixel output signal line 113 in one column is shared by a plurality of pixel signal processing units 103 in the corresponding column. The pixel output signal line 113 includes a plurality of wirings, and has at least a function of outputting a digital signal from the pixel signal processing unit 103 to the reading circuit 112, and a function of supplying a control signal for selecting a column for outputting a signal to the pixel signal processing unit 103. The reading circuit 112 outputs a signal to an external storage unit or signal processing unit of the photoelectric conversion device 100 via the output circuit 114 based on the control signal supplied from the control signal generation unit 115.

The arrangement of the photoelectric conversion units 102 in the pixel region 12 may be one-dimensional. Further, the function of the pixel signal processing unit 103 does not necessarily have to be provided one by one in all the pixels 101. For example, one pixel signal processing unit 103 may be shared by a plurality of pixels 101. In this case, the pixel signal processing unit 103 sequentially processes the signals output from the photoelectric conversion units 102, thereby providing the function of signal processing to each pixel 101.

As illustrated in FIGS. 3 and 4, the first circuit region 22 having a plurality of pixel signal processing units 103 is arranged in a region overlapping the pixel region 12 in the plan view. In the plan view, the vertical scanning circuit 110, the horizontal scanning circuit 111, the reading circuit 112, the output circuit 114, and the control signal generation unit 115 are arranged so as to overlap a region between an edge of the sensor substrate 11 and an edge of the pixel region 12. In other words, the sensor substrate 11 includes the pixel region 12 and a non-pixel region arranged around the pixel region 12. In the circuit substrate 21, the second circuit region 23 (described above in FIG. 2) having the vertical scanning circuit 110, the horizontal scanning circuit 111, the reading circuit 112, the output circuit 114, and the control signal generation unit 115 is arranged in a region overlapping with the non-pixel region in the plan view.

Note that the arrangement of the pixel output signal line 113, the arrangement of the reading circuit 112, and the arrangement of the output circuit 114 are not limited to those illustrated in FIG. 3. For example, the pixel output signal lines 113 may extend in the row direction, and may be shared by a plurality of pixel signal processing units 103 in corresponding rows. The reading circuit 112 may be provided so as to be connected to the pixel output signal line 113 of each row.

Figure 5:
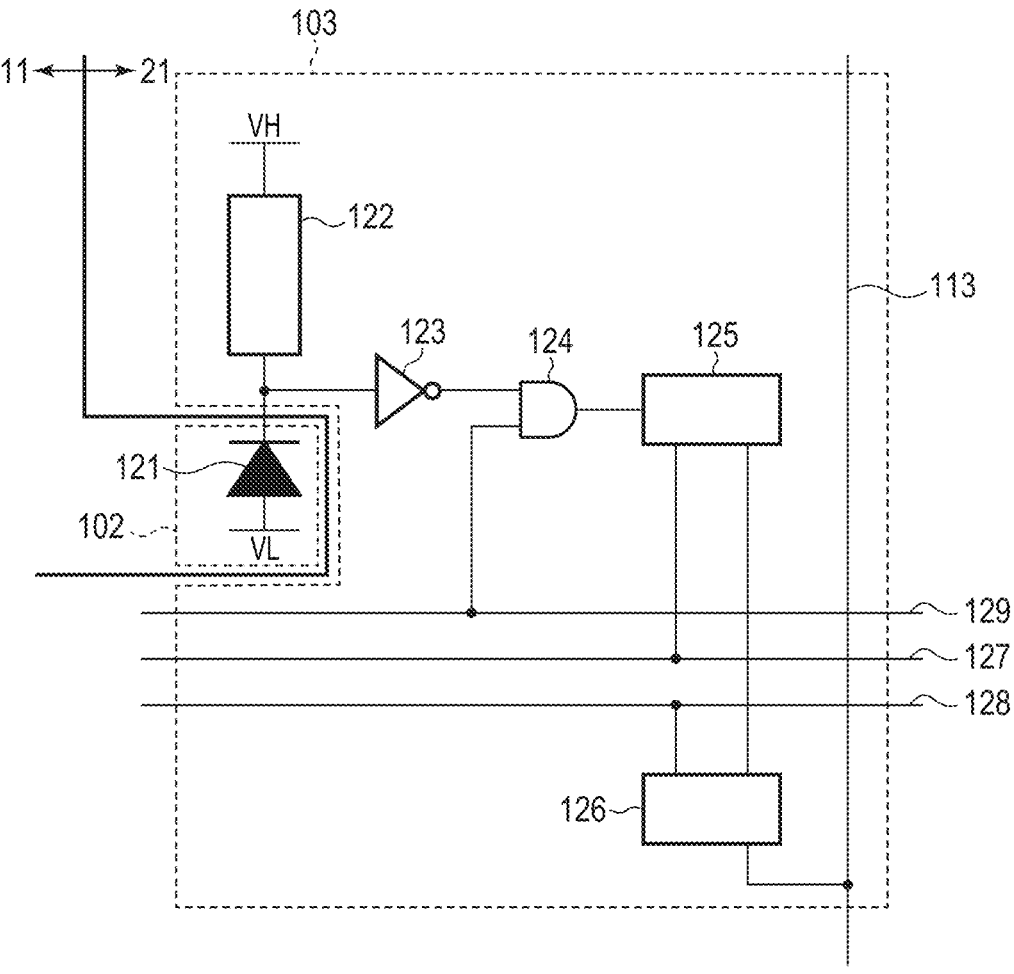
FIG. 5 is a schematic block diagram illustrating a configuration example of one pixel of a photoelectric conversion unit and a pixel signal processing unit according to the first embodiment.

FIG. 5 is a schematic block diagram illustrating a configuration example of one pixel of the photoelectric conversion unit 102 and the pixel signal processing unit 103 according to the present embodiment. FIG. 5 schematically illustrates a more specific configuration example including a connection relationship between the photoelectric conversion unit 102 arranged in the sensor substrate 11 and the pixel signal processing unit 103 arranged in the circuit substrate 21. In FIG. 5, driving lines between the vertical scanning circuit 110 and the pixel signal processing unit 103 in FIG. 4 are illustrated as driving lines 127, 128, and 129.

The photoelectric conversion unit 102 includes an APD 121. The pixel signal processing unit 103 includes a quenching element 122, a waveform shaping unit 123, a signal acquisition circuit 125, a selection circuit 126, and a gating circuit 124.

The APD 121 generates a charge corresponding to incident light by photoelectric conversion. A voltage VL (first voltage) is supplied to the anode of the APD 121. The cathode of the APD 121 is connected to a first terminal of the quenching element 122 and an input terminal of the waveform shaping unit 123. A voltage VH (second voltage) higher than the voltage VL supplied to the anode is supplied to the cathode of the APD 121. As a result, a reverse bias voltage that causes the APD 121 to perform the avalanche multiplication operation is supplied to the anode and the cathode of the APD 121. In the APD 121 to which the reverse bias voltage is supplied, when a charge is generated by the incident light, this charge causes avalanche multiplication, and an avalanche current is generated.

The operation modes in the case where a reverse bias voltage is supplied to the APD 121 include a Geiger mode and a linear mode. The Geiger mode is a mode in which a potential difference between the anode and the cathode is higher than a breakdown voltage, and the linear mode is a mode in which a potential difference between the anode and the cathode is near or lower than the breakdown voltage.

The APD operated in the Geiger mode is referred to as a single photon avalanche diode (SPAD). In this case, for example, the voltage VL (first voltage) is −30V, and the voltage VH (second voltage) is 1 V. The APD 121 may operate in the linear mode or the Geiger mode. In the case of the SPAD, a potential difference becomes greater than that of the APD of the linear mode, and the effect of avalanche multiplication becomes significant, so that the SPAD is preferable.

The quenching element 122 functions as a load circuit (quenching circuit) when a signal is multiplied by avalanche multiplication. The quenching element 122 suppresses the voltage supplied to the APD 121 and suppresses the avalanche multiplication (quenching operation). Further, the quenching element 122 returns the voltage supplied to the APD 121 to the voltage VH by passing a current corresponding to the voltage drop due to the quenching operation (recharge operation). The quenching element 122 may be, for example, a resistive element. In the present embodiment, it is assumed that the quenching element 122 is a resistive element.

The waveform shaping unit 123 shapes the potential change of the cathode of the APD 121 obtained at the time of photon detection, and outputs a pulse signal. For example, an inverter circuit is used as the waveform shaping unit 123. Although FIG. 5 illustrates an example in which one inverter is used as the waveform shaping unit 123, the waveform shaping unit 123 may be a circuit in which a plurality of inverters are connected in series, or may be another circuit having a waveform shaping effect.

The gating circuit 124 performs gating such that the pulse signal output from the waveform shaping unit 123 passes through for a predetermined period. During a period in which the pulse signal can pass through the gating circuit 124, a light reception pulse signal based on a photon incident on the APD 121 is counted in the signal acquisition circuit 125 in the subsequent stage. Accordingly, the gating circuit 124 controls an exposure period during which a signal based on incident light is generated in the pixel 101. The period during which the pulse signal passes is controlled by a control signal supplied from the vertical scanning circuit 110 through the driving line 129. FIG. 5 illustrates an example in which one AND circuit is used as the gating circuit 124. The pulse signal and the control signal (gating signal) are input to two input terminals of the AND circuit. The AND circuit outputs logical product of these to the signal acquisition circuit 125. Note that, the gating circuit 124 may have a circuit configuration other than the AND circuit as long as it realizes gating. Also, the waveform shaping unit 123 and the gating circuit 124 may be integrated by using a logic circuit such as a NAND circuit.

The signal acquisition circuit 125 includes a counter that counts the pulse signals output from the waveform shaping unit 123 via the gating circuit 124 and holds a digital signal indicating the count value. When a control signal is supplied from the vertical scanning circuit 110 through the driving line 127, the signal acquisition circuit 125 resets the signal held by the counter.

The selection circuit 126 is supplied with a control signal from the vertical scanning circuit 110 illustrated in FIG. 4 through the driving line 128 illustrated in FIG. 5. In response to this control signal, the selection circuit 126 switches between the electrical connection and the non-connection of the signal acquisition circuit 125 and the pixel output signal line 113. The selection circuit 126 includes, for example, a buffer circuit or the like for outputting a signal corresponding to a value held in the signal acquisition circuit 125.

In the example of FIG. 5, the selection circuit 126 switches between the electrical connection and the non-connection of the signal acquisition circuit 125 and the pixel output signal line 113; however, the method of controlling the signal output to the pixel output signal line 113 is not limited thereto. For example, a switch such as a transistor may be arranged at a node such as between the quenching element 122 and the APD 121 or between the photoelectric conversion unit 102 and the pixel signal processing unit 103, and the signal output to the pixel output signal line 113 may be controlled by switching the electrical connection and the non-connection. Alternatively, the signal output to the pixel output signal line 113 may be controlled by changing the value of the voltage VH or the voltage VL supplied to the photoelectric conversion unit 102 using a switch such as a transistor.

FIGS. 6A, 6B, and 6C are diagrams illustrating an operation of the APD 121 according to the present embodiment. FIG. 6A is a diagram illustrating a photon detection element 131 including the APD 121, the quenching element 122, and the waveform shaping unit 123 in FIG. 5. As illustrated in FIG. 6A, the connection node of the APD 121, the quenching element 122, and the input terminal of the waveform shaping unit 123 is referred to as a node A. Further, as illustrated in FIG. 6A, an output side of the waveform shaping unit 123 is referred to as a node B.

FIG. 6B is a graph illustrating a temporal change in the potential of the node A in FIG. 6A. FIG. 6C is a graph illustrating a temporal change in the potential of the node B in FIG. 6A. During a period from time t0 to time t1, the voltage VH-VL is applied to the APD 121 in FIG. 6A. When a photon enters the APD 121 at the time t1, avalanche multiplication occurs in the APD 121. As a result, an avalanche current flows through the quenching element 122, and the potential of the node A drops. Thereafter, the amount of potential drop further increases, and the voltage applied to the APD 121 gradually decreases. Then, at time t2, the avalanche multiplication in the APD 121 stops. Thereby, the voltage level of node A does not drop below a certain constant value. Then, during a period from the time t2 to time t3, a current that compensates for the potential drop flows from the node of the voltage VH to the node A via the quenching element, and the node A is settled to the original potential at the time t3.

In the above-described process, the potential of node B becomes the high level in a period in which the potential of node A is lower than a certain threshold value. In this way, the waveform of the drop of the potential of the node A caused by the incidence of the photon is shaped by the waveform shaping unit 123 and output as a pulse to the node B.

Figure 7:
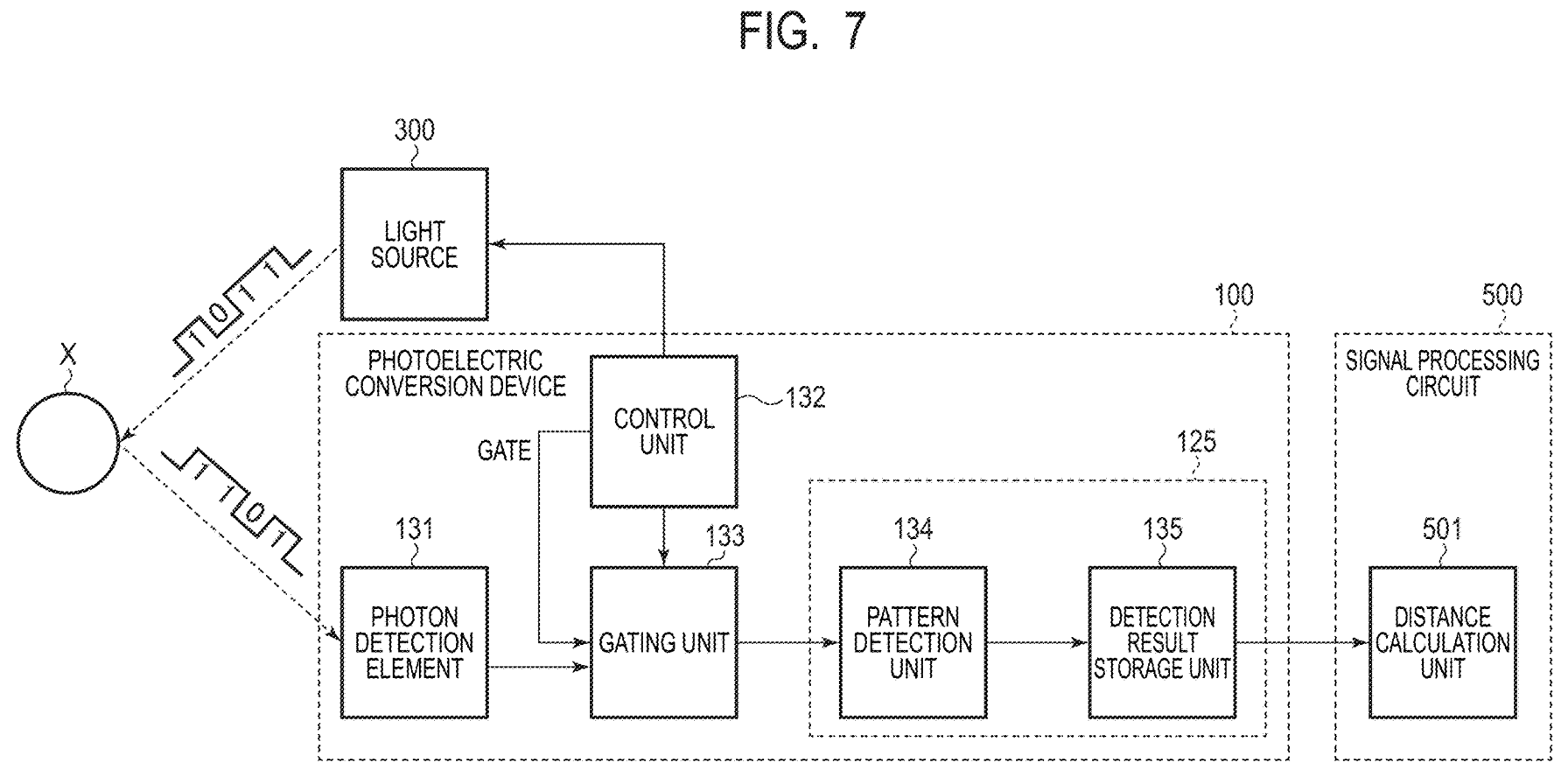
Figure 8:
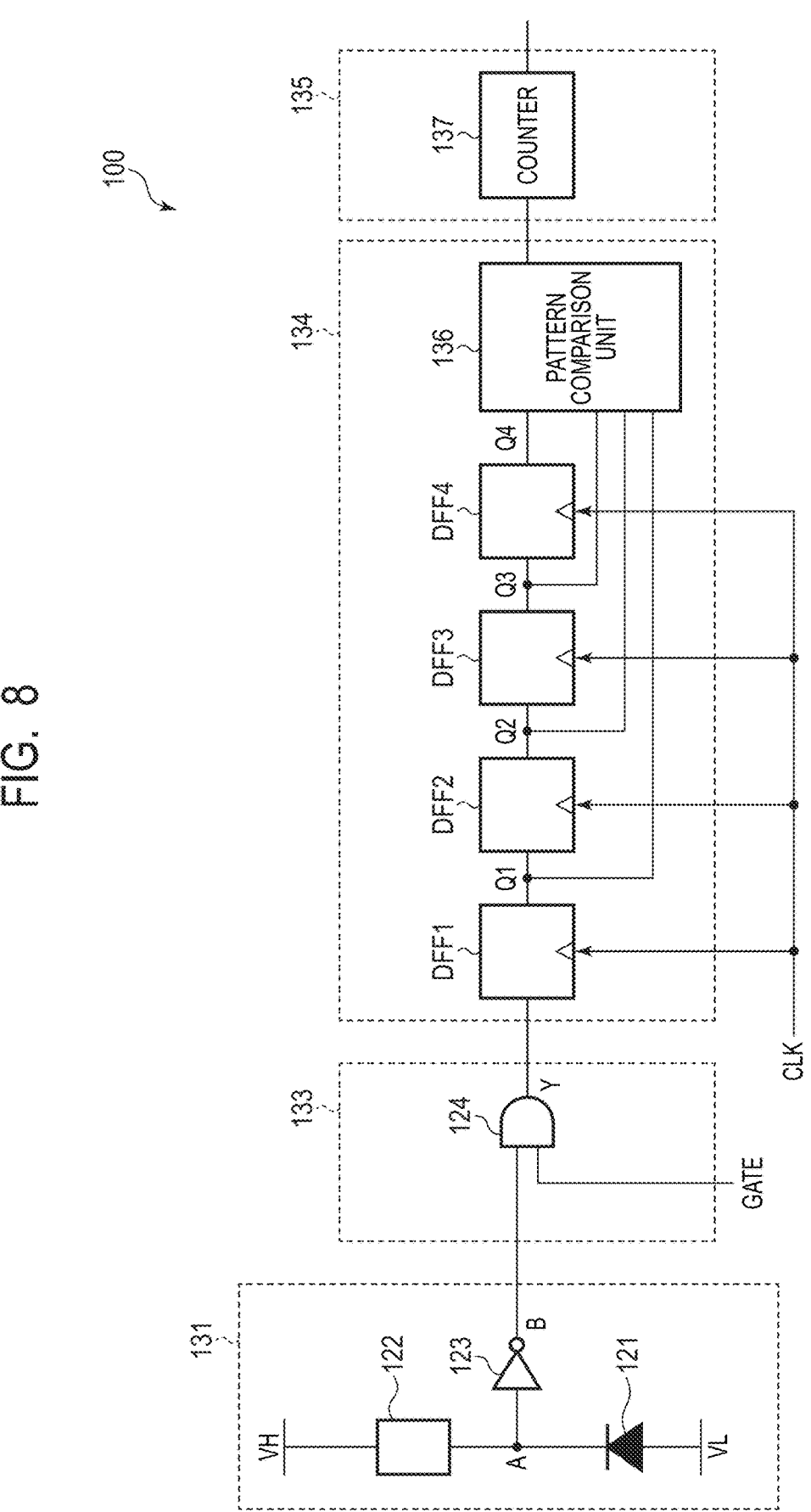
FIG. 8 is a pixel circuit diagram according to the first embodiment.

Next, an overall configuration of the ranging device 10 will be described in detail with reference to FIGS. 7 and 8. FIG. 7 is a functional block diagram illustrating a schematic configuration example of the ranging device 10 according to the present embodiment. FIG. 7 illustrates a more detailed configuration of the light source 300, the photoelectric conversion device 100, and the signal processing circuit 500 described with reference to FIG. 1. FIG. 8 is a pixel circuit diagram according to the present embodiment. FIG. 8 illustrates a circuit configuration of one pixel of the photoelectric conversion device 100 in more detail.

The photoelectric conversion device 100 includes a photon detection element 131, a control unit 132, a gating unit 133, and the signal acquisition circuit 125. The signal acquisition circuit 125 includes a pattern detection unit 134 and a detection result storage unit 135. The photon detection element 131 includes the APD 121, the quenching element 122, and the waveform shaping unit 123. The gating unit 133 includes the gating circuit 124. The pattern detection unit 134 includes D flip-flops DFF1, DFF2, DFF3, and DFF4 and a pattern comparison unit 136. The detection result storage unit 135 includes a counter 137. The signal processing circuit 500 includes a distance calculation unit 501.

The control unit 132 drives and synchronizes the light source 300 and the photoelectric conversion device 100. Under the control of the control unit 132, the light source 300 emits light in a predetermined light emission pulse pattern in which light emission and non-light emission change in a certain period. As illustrated in FIG. 7, in the present embodiment, it is assumed that the light emission pulse pattern is "1011". Here, "1" denotes a light emission period, and "0" denotes a non-light emission period. "1011" indicates that among the four consecutive periods, the first, third, and fourth periods are the light emission periods, and the second period is the non-light emission period. The light emission pulse pattern is a digital signal including 4-bit information.

The bit length of the light emission pulse pattern is not limited to four bits, and may be shorter than four bits or longer than four bits as long as the bit length is two bits or more, and can be appropriately set according to a semiconductor process or the like used for manufacturing the photoelectric conversion device 100. The longer the bit length of the light emission pulse pattern is, the larger the circuit scale required for processing is, but much information can be included in the light emission pulse pattern. The light emission pulse pattern is not limited to "1011", and can be appropriately set.

As described above, the light emission pulse pattern may include information according to the number of bits. An example of the information included in the light emission pulse pattern is identification information of the light source 300. The identification information of the light source 300 includes, for example, a manufacturer ID of the light source 300, a model ID of the light source 300, and a serial number of the light source 300.

Another example of information included in the light emission pulse pattern is identification information of the photoelectric conversion device 100. The identification information of the photoelectric conversion device 100 includes, for example, a manufacturer ID of the photoelectric conversion device 100, a model ID of the photoelectric conversion device 100, and a serial number of the photoelectric conversion device 100. When the ranging device 10 is configured as a device in which the photoelectric conversion device 100 and the light source 300 are integrated, information included in the light emission pulse pattern may be identification information of the entire ranging device 10. When such identification information is included in the light emission pulse pattern, the light emission pulse pattern can be set so as be less likely to coincide with a light emission pulse pattern of another device.

Another example of the information included in the light emission pulse pattern is an installation environment of the light source 300 or the photoelectric conversion device 100. Examples of the installation environment include an installation location of the light source 300, an installation location of the photoelectric conversion device 100, and weather. When such identification information is included in the light emission pulse pattern, additional information can be added to the light emission pulse pattern.

The light emission pulse pattern may include information in which a plurality of the above examples are combined. For example, when the light emission pulse pattern is a digital signal of 24 bits or more, the upper six bits may be the manufacturer ID of the light source 300, the next eight bits may be the model ID of the light source 300, and the next 10 bits may be the serial number of the light source 300. By combining a plurality of kinds of information, the light emission pulse pattern can be set so as to be less likely to coincide with a light emission pulse pattern of another device.

Further, it is not essential that the digital value included in the light emission pulse pattern include information meaningful to itself, such as the identification information and the installation environment. That is, the digital values included in the light emission pulse pattern may be randomly determined.

The light emitted from the light source 300 is reflected by the object X and received by the APD 121 of the photon detection element 131. The photon detection element 131 generates a light reception pulse signal corresponding to the incident light, and outputs the light reception pulse signal from the node B to the gating unit 133. The light reception pulse signal is input to one input terminal of the gating circuit 124. The control unit 132 outputs a gating signal GATE indicating a gating period with respect to the light emission timing of the light source 300 to the gating unit 133. The gating signal GATE is input to the other input terminal of the gating circuit 124.

The control unit 132 outputs the gating signal GATE so as to sequentially shift the gating period for each period during which the ranging is performed. The shift amount of the gating signal GATE can be appropriately set according to the range of the ranging, and can be set to, for example, about ten nanoseconds to one microsecond. The gating circuit 124 is, for example, an AND circuit. The gating circuit 124 performs a gating operation of calculating a logical product of the light reception pulse signal and the gating signal GATE, and outputs the obtained signal to the pattern detection unit 134. In the case where the light reception pulse signal is based on light emitted from the light source 300, the signal output from the gating circuit 124 may include a light reception pulse pattern similar to the above-described light emission pulse pattern.

The length of the gating period, that is, the length of the on period of the gating signal GATE is set to be equal to or longer than the length of the duration of the light emission pulse pattern. Thus, the pattern detection unit 134 can acquire a light reception pulse pattern corresponding to the entire light emission pulse pattern. More typically, the length of the on period of the gating signal GATE may be set to be approximately the same as the length of the duration of the light emission pulse pattern. The length of the on period of the gating signal GATE may be longer than the length of the duration of the light emission pulse pattern. However, in this case, the length of the gating period may be enlarged, the number of shifting of the gating period performed within a predetermined period may be decreased, and the distance resolution or accuracy of the ranging may be decreased.

An output terminal of the gating circuit 124 is connected to an input terminal of the D flip-flop DFF1. An output terminal of the D flip-flop DFF1 is connected to an input terminal of the D flip-flop DFF2. An output terminal of the D flip-flop DFF2 is connected to an input terminal of the D flip-flop DFF3. An output terminal of the D flip-flop DFF3 is connected to an input terminal of the D flip-flop DFF4. Output terminals of the D flip-flops DFF1, DFF2, DFF3, and DFF4 are connected to the pattern comparison unit 136. In this way, the D flip-flops DFF1, DFF2, DFF3, and DFF4 are cascade-connected to form a shift register.

A clock signal CLK is input to control terminals of the D flip-flops DFF1, DFF2, DFF3, and DFF4. The operation timings of the D flip-flops DFF1, DFF2, DFF3, and DFF4 are controlled by the clock signal CLK. Respective bits of the light reception pulse pattern included in the light reception pulse signal that has passed through the gating unit 133 are stored in the D flip-flops DFF1, DFF2, DFF3, and DFF4.

The pattern comparison unit 136 compares each bit of the light reception pulse pattern held in the D flip-flops DFF1, DFF2, DFF3, and DFF4 with a corresponding bit of the light emission pulse pattern that is set in advance in the photoelectric conversion device 100. Thus, the pattern comparison unit 136 detects a pattern included in the light reception pulse pattern. The pattern comparison unit 136 outputs the detection result of the pattern to the counter 137 of the detection result storage unit 135.

For example, the pattern comparison unit 136 outputs "1" to the counter 137 when bits of the light reception pulse pattern and corresponding bits of the light emission pulse pattern match each other, and outputs "0" to the counter 137 when any one of bits of the light reception pulse pattern and corresponding bits of the light emission pulse pattern does not match each other. The counter 137 has a function of holding the detection result output from the pattern detection unit 134. "1" is a signal indicating that the light emitted from the light source 300 is received, and "0" is a signal indicating that the light emitted from the light source 300 is not received. The signal holding function of the counter 137 may be included in the pattern detection unit 134 or the pattern comparison unit 136.

The distance calculation unit 501 calculates distance information based on the shift amount of the on period of the gating signal GATE with respect to the light emission start time of the light source 300 and the detection result stored in the detection result storage unit. When the value stored in the detection result storage unit 135 is "1", the distance calculation unit 501 calculates the distance using the expression "light speed×shift amount/2". For example, when the shift amount of the gating signal GATE with respect to the light emission start time is one microsecond and the value stored in the detection result storage unit 135 is "1", the distance calculation unit 501 calculates the distance to be about 150 m based on the above described expression. When the value stored in the detection result storage unit 135 is "0", the distance calculation unit 501 does not perform distance calculation. As described above, in the present embodiment, by using the comparison result between the light reception pulse pattern and the light emission pulse pattern for the ranging, the influence of light (light from another ranging device, ambient light, or the like) from a light source other than the light source 300 can be reduced.

In the above example, it is assumed that the measurement by the gating signal GATE of one shift amount is performed once, but the measurement by the gating signal GATE of one shift amount may be performed plural times. In this case, the counter 137 of the detection result storage unit 135 is configured to hold a count value of a plurality of bits. Thus, the detection result storage unit 135 can hold a plurality of measurement results. In this case, the distance calculation unit 501 may generate a frequency distribution using a plurality of count values respectively corresponding to a plurality of shift amounts, and may calculate a distance by detecting a peak of the frequency distribution. When a part of the light reception pulse pattern is missing, or when detection of incident light fails, a measurement error may occur. By performing the measurement using the gating signal GATE of one shift amount a plurality of times, the influence of the measurement error is reduced, and thus the ranging accuracy can be improved.

Figure 9:
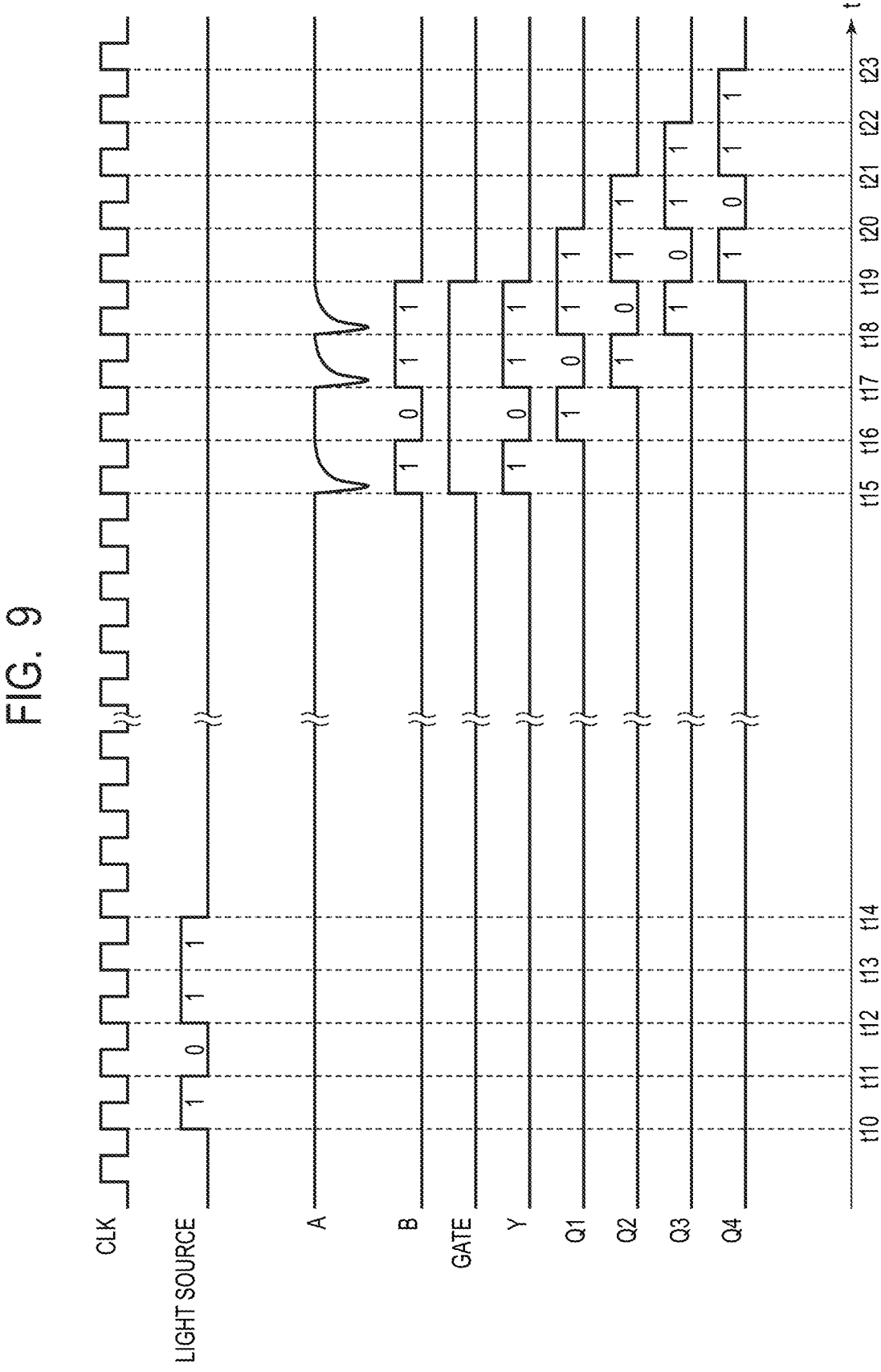
FIG. 9 is a timing chart illustrating an operation of the pixel circuit according to the first embodiment.

Next, the operation of the ranging device 10 will be described in detail with reference to FIGS. 8 and 9. FIG. 9 is a timing chart illustrating an operation of the pixel circuit according to the present embodiment. FIG. 9 illustrates the clock signal CLK, the gating signal GATE, and potentials of nodes A, B, Y, Q1, Q2, Q3, and Q4. The "light source" in FIG. 9 indicates a light emission pulse pattern of the light source 300. In the illustration of FIG. 9, the influence of the delay time, the threshold voltage, and the like of the waveform shaping unit 123 is not taken into consideration for simplicity of explanation.

As illustrated in FIG. 8, the node A is a connection node of the APD 121, the quenching element 122, and the input terminal of the waveform shaping unit 123. The node B is the output terminal node of the waveform shaping unit 123. The node Y is the output terminal node of the gating circuit 124. The nodes Q1, Q2, Q3, and Q4 are output terminal nodes of D flip-flops DFF1, DFF2, DFF3, and DFF4, respectively.

In the example of FIG. 9, it is assumed that the clock signal CLK is a common signal between the photoelectric conversion device 100 and the light source 300, and functions as a synchronization signal of the photoelectric conversion device 100 and the light source 300. However, the photoelectric conversion device 100 and the light source 300 may operate with individual clock signals, and the photoelectric conversion device 100 and the light source 300 may be synchronized with each other with a synchronization signal different from the clock signals.

At time t10, the light source 300 starts light emission in accordance with the rising edge of the clock signal CLK.

Thereafter, at time t11, the light source 300 stops light emission in accordance with the rising edge of the clock signal CLK. A period from the time t10 to the time t11 corresponds to the first bit of the light emission pulse pattern.

In a period from the time t11 to time t12, the light source 300 does not emit light. The period from the time t11 to the time t12 corresponds to the second bit of the light emission pulse pattern.

At the time t12, the light source 300 starts light emission in accordance with the rising edge of the clock signal CLK. At the rising edge of the clock signal CLK at time t13, the light source 300 maintains the light emitting state. Thereafter, at time t14, the light source 300 stops light emission in accordance with the rising edge of the clock signal CLK. A period from the time t12 to the time t13 corresponds to the third bit of the light emission pulse pattern. A period from the time t13 to the time t14 corresponds to the fourth bit of the light emission pulse pattern.

As described above, in the period from the time t10 to the time t14, the light source 300 emits light according to the light emission pulse pattern "1011" based on the control of the control unit 132. Thereafter, the emitted light is reflected by the object X. The reflected light is incident on the APD 121.

In a period from time t15 to time t16, light corresponding to the first bit of the light emission pulse pattern is incident on the APD 121. The difference between the time t15 and the time t10 corresponds to the flight time of light. When light is incident on the APD 121 at the time t15, avalanche multiplication occurs in the APD 121, and the potential of the node A drops. Thereafter, the amount of potential drop further increases, the voltage applied to the APD 121 gradually decreases, and the avalanche multiplication in the APD 121 stops. Thereby, the voltage level of the node A does not drop below a certain constant value. Thereafter, a current that compensates the voltage drop flows from the node of the voltage VH to the node A via the quenching element 122, and the node A is settled to the original potential until the time t16.

In a period from the time t16 to time t17, light corresponding to the second bit of the light emission pulse pattern is incident on the APD 121. Since the light source 300 does not emit light from the time t11 to the time t12, light does not enter the APD 121, and the potential of the node A does not change.

In period from the time t17 to time t18, light corresponding to the third bit of the light emission pulse pattern is incident on the APD 121. In a period from the time t18 to time t19, light corresponding to the fourth bit of the light emission pulse pattern is incident on the APD 121. In these periods, similarly to the period from the time t15 to the time t16, the potential of the node A varies due to the incident light.

Through these operations, the potential of the node B in the period from the time t15 to the time t16 and in the period from the time t17 to the time t19 is at the high level, and the potential of the node B in the period from the time t16 to the time t17 is at the low level. In a period from the time t15 to the time t19, the gating signal GATE input to the gating circuit 124 is at the high level. The gating circuit 124 outputs the logical product of the potential of the node B and the high-level potential of the gating signal GATE to the node Y. The potential of the node Y in the period from the time t15 to the time t16 and in the period from the time t17 to the time t19 is the high level, and the potential of the node Y in the period from the time t16 to the time t17 is the low level.

Therefore, the light reception pulse pattern input to the pattern detection unit 134 in the period from the time t15 to the time t19 is "1011".

The D flip-flops DFF1, DFF2, DFF3, and DFF4 form a shift register, and each D flip-flop transmits an input signal to a subsequent stage at a timing when the clock signal CLK rises. The high-level pulse based on the light incident at the time t15 is delayed by the D flip-flop DFF1, and is transmitted to the node Q1 in accordance with the rising edge of the clock signal CLK at the time t16. Similarly, this pulse is transmitted to the node Q2 at the time t17, to the node Q3 at the time t18, and to the node Q4 at the time t19. In this manner, the light reception pulse pattern "1011" input to the pattern detection unit 134 is sequentially transmitted to the D flip-flop in the subsequent stage every time the clock signal CLK rises. At the time t19, the signals of the nodes Q4, Q3, Q2, and Q1 indicate "1", "0", "1", and "1", respectively.

The pattern comparison unit 136 compares the signals of the nodes Q4, Q3, Q2, and Q1 at this time with "1011" of the light emission pulse pattern stored in advance, and outputs a signal corresponding to the comparison result. Thus, the pattern comparison unit 136 can determine whether the incident light is light emitted from the light source 300. In this example, the light reception pulse pattern "1011" matches with the light emission pulse pattern "1011" of the light source 300. Accordingly, the pattern comparison unit 136 outputs "1" (first signal) to the counter 137 as a signal indicating that the light emitted from the light source 300 has been received. The counter 137 counts up based on this signal.

FIG. 9 illustrates an example in which the light reception pulse pattern and the light emission pulse pattern match with each other. For example, when the light received by the photon detection element 131 is emitted from a light source other than the light source 300, the light reception pulse pattern does not match with the light emission pulse pattern. In this case, the pattern comparison unit 136 outputs "0" (second signal) to the counter 137 as a signal indicating that the light emitted from the light source 300 is not received. In this case, the counter 137 does not count up.

Examples of light sources other than the light source 300 include light sources of other ranging devices and light sources of ambient light such as sunlight. These light sources do not have a unique emission pulse pattern or have a different emission pulse pattern than the light source 300. When the incident light is emitted from these light sources, the light reception pulse pattern and the light emission pulse pattern do not match with each other in the pattern detection processing in the pattern comparison unit 136. Accordingly, the pattern comparison unit 136 can identify whether the received light is emitted from the light source 300 of the ranging device 10 or from another light source.

The ranging device 10 of the present embodiment has a function of comparing the light reception pulse pattern of the light received by the photon detection element 131 with the light emission pulse pattern of the light source 300 and outputting a signal corresponding to the comparison result. Thus, the ranging device 10 can identify whether the light received by the photon detection element 131 is emitted from the light source 300 of the ranging device 10 or from another light source, and can reduce influence of the light emitted from another light source on the ranging accuracy. Therefore, according to the present embodiment, a photoelectric conversion device in which influence of light from a light source other than a corresponding light source is reduced is provided.

Second Embodiment

In the present embodiment, an example in which the quenching element 122 described in the first embodiment is a transistor and a recharging operation can be performed by the clock signal CLK will be described. The description of elements common to those of the first embodiment may be omitted or simplified as appropriate.

Figure 10:
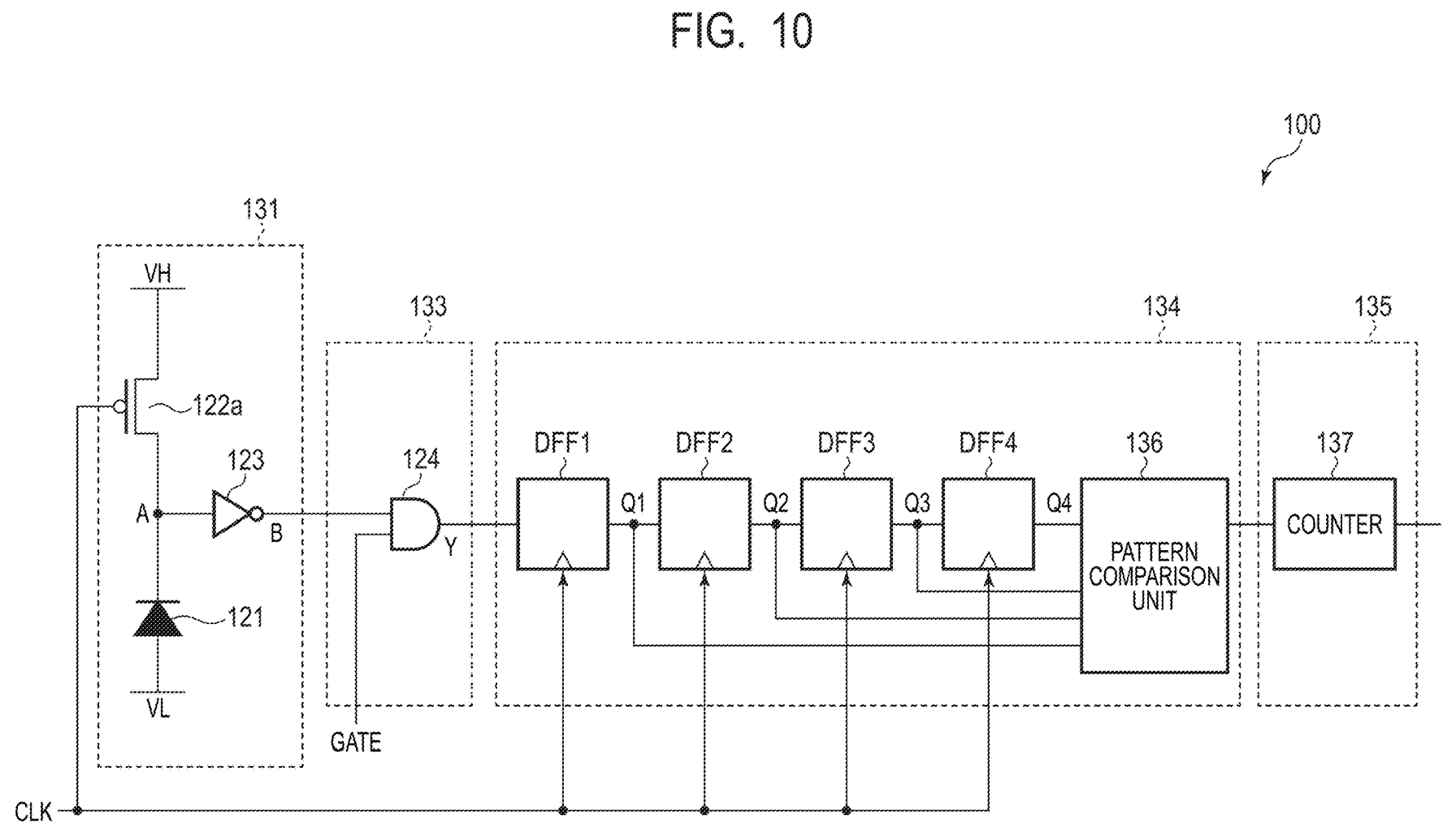

FIG. 10 is a pixel circuit diagram according to the present embodiment. The pixel circuit diagram of the present embodiment is different from the pixel circuit diagram of the first embodiment illustrated in FIG. 8 in that the quenching element 122 is a PMOS transistor 122a controlled by the clock signal CLK. The drain of the PMOS transistor 122a is connected to the cathode of the APD 121 and the input terminal of the waveform shaping unit 123. The source of the PMOS transistor 122a is supplied with the voltage VH. The clock signal CLK is input to the gate of the PMOS transistor 122a. That is, in the present embodiment, the common clock signal CLK is input to the gate of the PMOS transistor 122a and the control terminals of the D flip-flops DFF1, DFF2, DFF3, and DFF4.

The PMOS transistor 122a is turned on when the potential of the clock signal CLK is at the low level, and is turned off when the potential of the clock signal CLK is at the high level. The PMOS transistor 122a functions as a recharging circuit that periodically resets the output potential of the APD 121 based on the clock signal CLK. The clock signal CLK is common to the PMOS transistor 122a and the shift register. Accordingly, the timing at which the PMOS transistor 122a performs the reset operation is synchronized with the timing at which the pattern detection unit 134 acquires one bit of the light reception pulse pattern.

Figure 11:
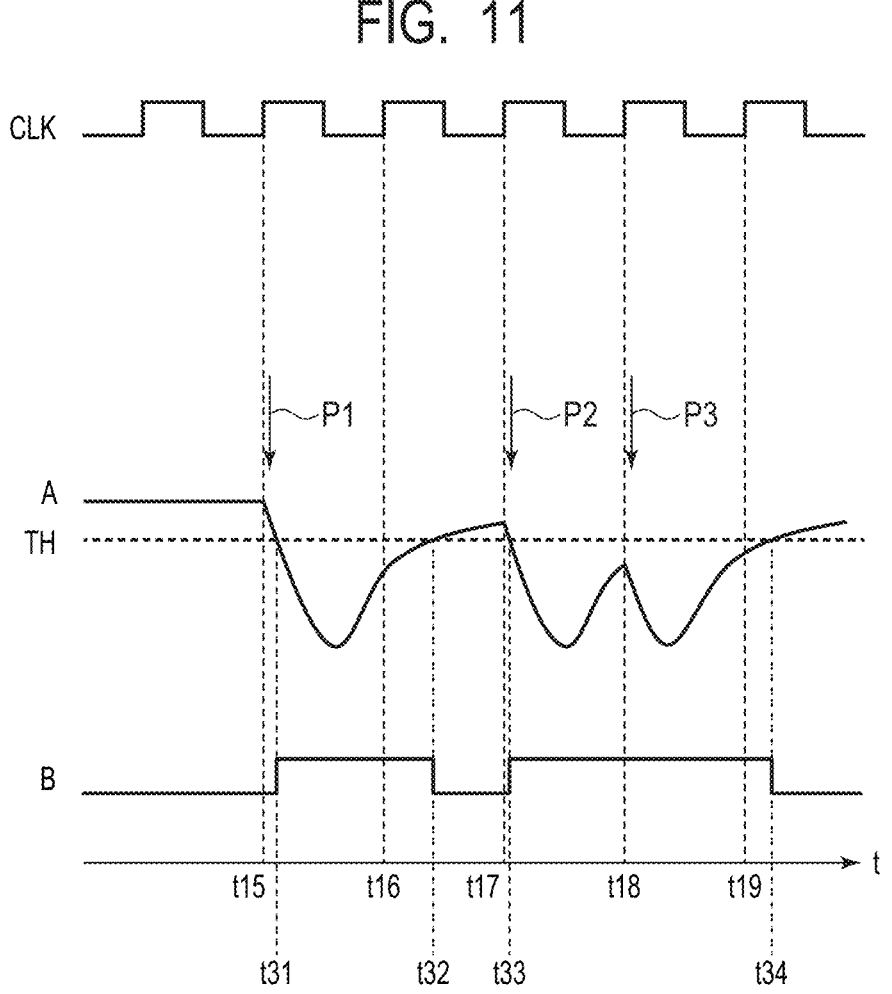
FIG. 11 is a timing chart illustrating an operation of a pixel circuit according to a comparative example of the second embodiment.
Figure 12:
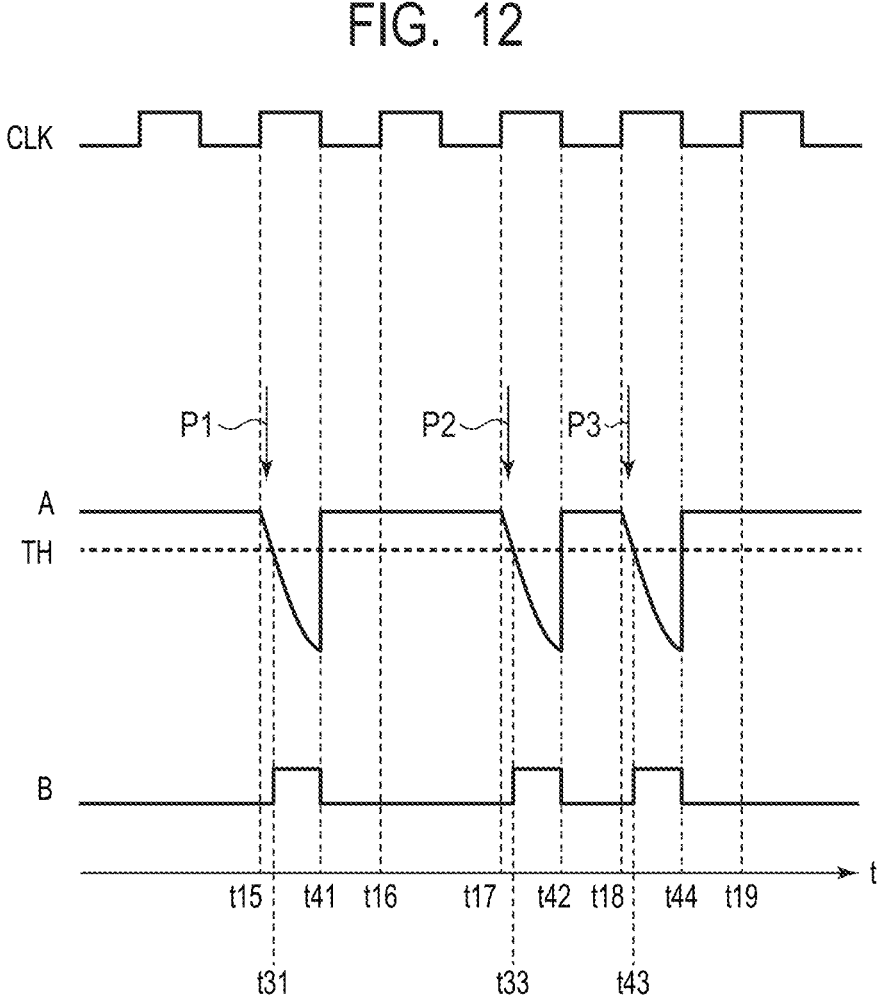
FIG. 12 is a timing chart illustrating an operation of a pixel circuit according to the second embodiment.

Next, an operation and effect of the pixel circuit according to the present embodiment will be described with reference to FIGS. 11 and 12. FIG. 11 is a timing chart illustrating an operation of a pixel circuit according to a comparative example of the second embodiment. FIG. 12 is a timing chart illustrating an operation of a pixel circuit according to the second embodiment. In FIGS. 11 and 12, among the timing charts illustrated in FIG. 9, the clock signal CLK and the potentials of the nodes A and B in the vicinity of the period from the time t15 to the time t19 at which light is received are extracted and illustrated. FIGS. 11 and 12 illustrate a threshold value TH at which the level of the output signal of the waveform shaping unit 123 is switched.

FIG. 11 is a timing chart assuming that the period of the light emission pulse or the period of the clock signal CLK is shorter than the settling time of the potential of the node A in the circuit configuration of the first embodiment. Problems that may occur in the configuration of the first embodiment will be described with reference to FIG. 11. Similarly to the first embodiment, the light emission pulse pattern is "1011".

When a photon P1 is incident on the APD 121 at the time t15, avalanche multiplication occurs in the APD 121, and the potential of the node A drops. At time t31, the potential of the node A becomes lower than the threshold value TH, and the potential of the node B changes from the low level to the high level.

Since no light is incident at the time t16, the potential variation of the node A due to the avalanche multiplication does not occur, but the settling of the potential variation at the time t15 is not completed, and the potential of the node A is lower than the threshold value TH. Therefore, the potential of the node B is maintained at the high level. At time t32, the potential of the node A becomes higher than the threshold value TH, and the potential of the node B changes from the high level to the low level.

When a photon P2 is incident on the APD 121 at the time t17, avalanche multiplication occurs in the APD 121, and the potential of the node A drops. At time t33, the potential of the node A becomes lower than the threshold value TH, and the potential of the node B changes from the low level to the high level. Thereafter, when a photon P3 is incident on the APD 121 at the time t18, avalanche multiplication occurs in the APD 121, and the potential of the node A drops again. At this time, since the potential of the node A continues to be maintained lower than the threshold value TH, the potential of the node B is maintained at the high level. At time t34, the potential of the node A becomes higher than the threshold value TH, and the potential of the node B changes from the high level to the low level.

As described above, since the settling time of the potential of the node A is longer than the period of the light emission pulse or the period of the clock signal CLK, the potential of the node B is at the high level regardless of whether light is incident during the period from the time t16 to the time t32. As a result, the light reception pulse pattern may be erroneously detected as "1111".

FIG. 12 is a timing chart assuming a case where the circuit configuration of the second embodiment is applied in the situation of FIG. 11.

At the time t15, when the clock signal CLK becomes the high level, the PMOS transistor 122a turns off. When a photon P1 is incident on the APD 121 at the time t15, avalanche multiplication occurs in the APD 121, and the potential of the node A drops. At the time t31, the potential of the node A becomes lower than the threshold value TH, and the potential of the node B changes from the low level to the high level.

At time t41, when the clock signal CLK becomes the low level, the PMOS transistor 122a turns on. Thus, the potential of the node A is reset to the original potential. By this reset, the potential of the node A becomes higher than the threshold value TH, and the potential of the node B changes from the high level to the low level.

Since no light is incident at the time t16, potential variation of the node A due to avalanche multiplication does not occur. Unlike the example of FIG. 11, since the potential is reset at the time t41, the potential of the node A is higher than the threshold value TH. Therefore, the potential of the node B is maintained at the low level.

At the time t17, when the clock signal CLK becomes the high level, the PMOS transistor 122a turns off. When a photon P2 is incident on the APD 121 at the time t17, avalanche multiplication occurs in the APD 121, and the potential of the node A drops. At time the t33, the potential of the node A becomes lower than the threshold value TH, and the potential of the node B changes from the low level to the high level.

At time t42, when the clock signal CLK becomes the low level, the PMOS transistor 122a turns on. Thus, the potential of the node A is reset to the original potential. By this reset, the potential of the node A becomes higher than the threshold value TH, and the potential of the node B changes from the high level to the low level.

At the time t18, when the clock signal CLK becomes the high level, the PMOS transistor 122a turns off. When a photon P3 is incident on the APD 121 at the time t18, avalanche multiplication occurs in the APD 121, and the potential of the node A drops. At time t43, the potential of the node A becomes lower than the threshold value TH, and the potential of the node B changes from the low level to the high level.

At time t44, when the clock signal CLK becomes the low level, the PMOS transistor 122a turns on. Thus, the potential of the node A is reset to the original potential. By this reset, the potential of the node A becomes higher than the threshold value TH, and the potential of the node B changes from the high level to the low level.

As described above, when the PMOS transistor 122a is turned on, the potential of the node A is reset. Thereby, even when the settling time is longer than the period of the light emission pulse or the period of the clock signal CLK, the potential of the node B becomes the low level during the period from the time t16 to the time t17, no light being incident in the period. Therefore, by resetting the potential of the PMOS transistor 122a, the possibility of erroneous detection due to the settling time as illustrated in FIG. 11 is reduced.

According to the present embodiment, similarly to the first embodiment, a photoelectric conversion device in which influence of light from light sources other than a corresponding light source is reduced is provided. Further, according to the present embodiment, it is possible to provide a photoelectric conversion device in which the possibility of erroneous detection due to the settling time is reduced.

Third Embodiment

In this embodiment, a configuration example of a pixel circuit capable of detecting incident light by integrating output signals from a plurality of photon detection elements will be described. The description of elements common to those of the first embodiment may be omitted or simplified as appropriate.

Figure 13:
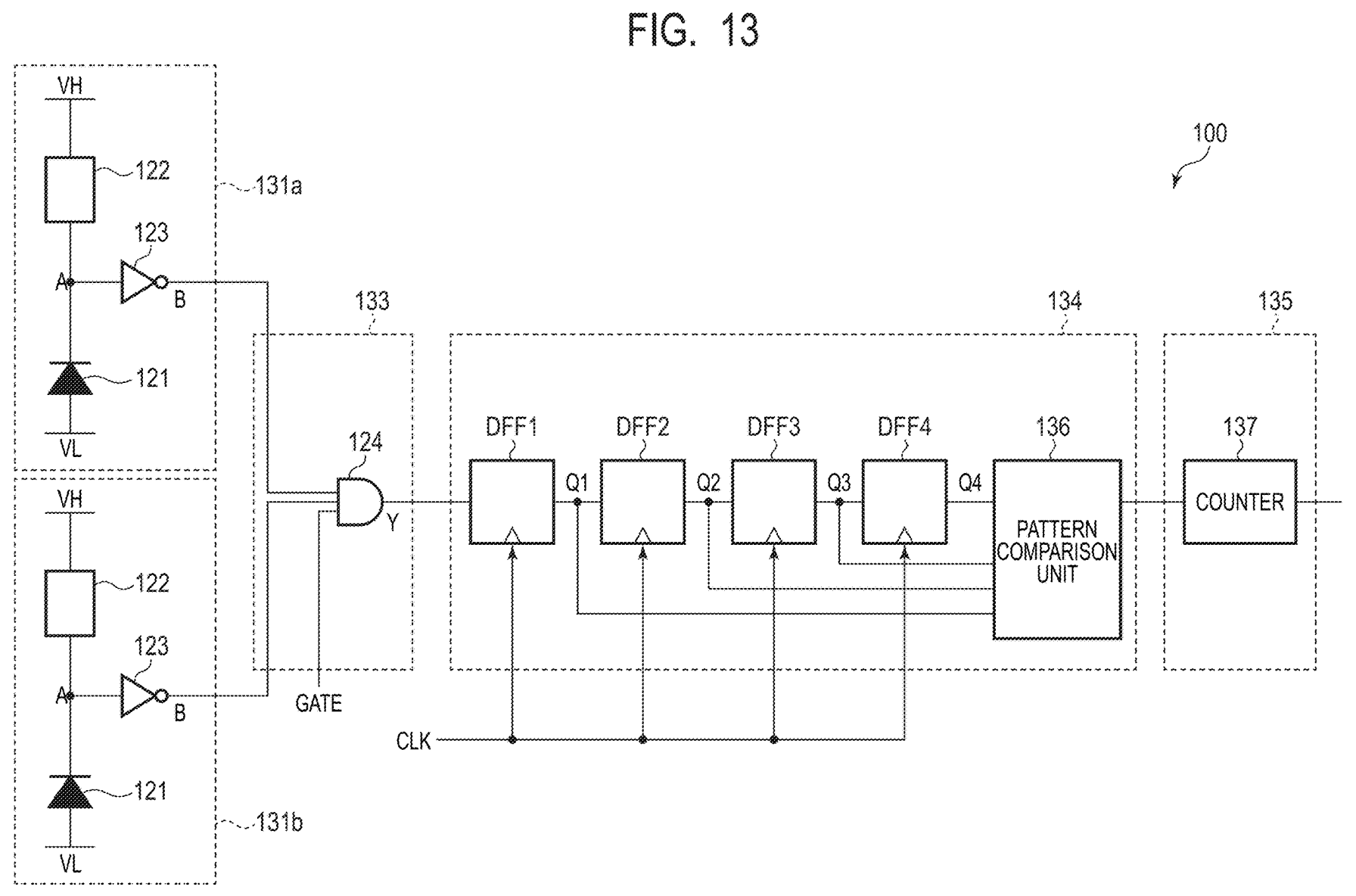

FIG. 13 is a pixel circuit diagram according to the present embodiment. In the photoelectric conversion device 100 of the present embodiment, a plurality of photon detection elements 131a and 131b are connected in parallel to the gating unit 133. That is, the output terminal of the waveform shaping unit 123 of the photon detection element 131a is connected to one input terminal of the gating circuit 124, and the output terminal of the waveform shaping unit 123 of the photon detection element 131b is connected to another input terminal of the gating circuit 124. The gating circuit 124 performs a gating operation of calculating a logical product of the light reception pulse signal from the photon detection element 131a, the light reception pulse signal from the photon detection element 131b, and the gating signal GATE, and outputs the obtained signal to the pattern detection unit 134. Thus, when light is incident on only one of the photon detection element 131a and the photon detection element 131b, the light detection can be disabled. This reduces the possibility of erroneous detection due to influence of external light or the like.

According to the present embodiment, a photoelectric conversion device in which influence of light from a light source other than a corresponding light source is further reduced is provided.

In the present embodiment, the two photon detection elements 131a and 131b are connected in parallel to the gating unit 133, but the number of photon detection elements connected to the gating unit 133 may be three or more.

Fourth Embodiment

Figure 14A:
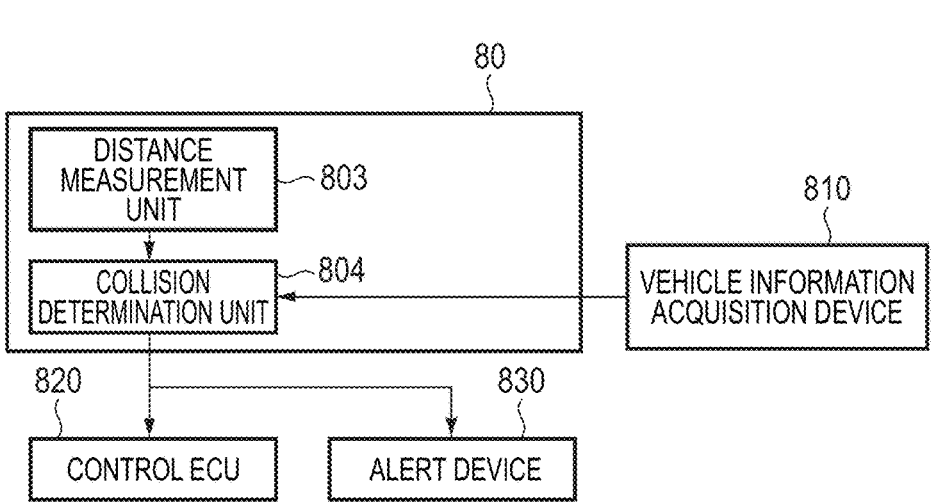
FIGS. 14A and 14B are schematic diagrams of element according to a fourth embodiment.
Figure 14B:
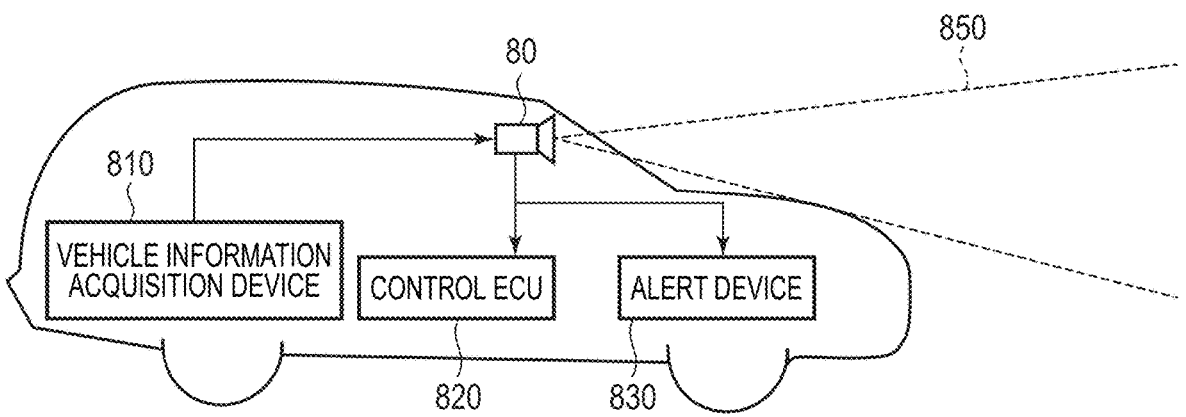

FIGS. 14A and 14B are block diagrams of equipment relating to an in-vehicle ranging device according to the present embodiment. Equipment 80 includes a distance measurement unit 803, which is an example of the ranging device of the above-described embodiments, and a signal processing device (processing device) that processes a signal from the distance measurement unit 803. The equipment 80 includes the distance measurement unit 803 that measures a distance to an object, and a collision determination unit 804 that determines whether or not there is a possibility of collision based on the measured distance. The distance measurement unit 803 is an example of a distance information acquisition unit that obtains distance information to the object. That is, the distance information is information on a distance to the object or the like. The collision determination unit 804 may determine the collision possibility using the distance information.

The equipment 80 is connected to a vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm, displaying alert information on a screen of a car navigation system or the like, or giving vibration to a seat belt or a steering wheel. These devices of the equipment 80 function as a movable body control unit that controls the operation of controlling the vehicle as described above.

In the present embodiment, ranging is performed in an area around the vehicle, for example, a front area or a rear area, by the equipment 80. FIG. 14B illustrates equipment when ranging is performed in the front area of the vehicle (ranging area 850). The vehicle information acquisition device 810 as a ranging control unit sends an instruction to the equipment 80 or the distance measurement unit 803 to perform the ranging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiments, and various modifications are possible. For example, an example in which some of the configurations of any one of the embodiments are added to other embodiments and an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that any of the embodiments described above is merely an example of an embodiment for carrying out the present disclosure, and the technical scope of the present disclosure should not be construed as being limited by the embodiments. That is, the present disclosure can be implemented in various forms without departing from the technical idea or the main features thereof.

According to the present invention, there is provided a photoelectric conversion device in which influence of light from a light source other than a corresponding light source is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-113641, filed Jul. 11, 2023, which is hereby incorporated by reference herein in its entirety.

What is claimed is:

1. A photoelectric conversion device comprising:
a photon detection element configured to generate a light reception pulse signal according to incident light;

a control unit configured to control a light emission pulse pattern of a light source, a light emission timing of the light source, and a gating period with respect to the light emission timing;

a gating unit configured to output a light reception pulse pattern of the incident light based on the light reception pulse signal that is input in the gating period;

a pattern detection unit configured to compare the light reception pulse pattern with the light emission pulse pattern to output a signal according to a comparison result; and a counter, wherein a length of the gating period is equal to or greater than a length of a duration of the light emission pulse pattern, wherein the pattern detection unit outputs a first signal indicating that light has been received when it is determined that the light reception pulse pattern matches the light emission pulse pattern, and wherein the counter is configured to count the first signal.

2. The photoelectric conversion device according to claim 1, wherein a distance from the photoelectric conversion device to an object is calculated based on a count value held in the counter.

3. The photoelectric conversion device according to claim 1, wherein the pattern detection unit includes a shift register configured to store a digital signal included in the light reception pulse pattern.

4. The photoelectric conversion device according to claim 3, wherein the pattern detection unit compares each bit of the digital signal stored in the shift register with a corresponding bit of the light emission pulse pattern.

5. The photoelectric conversion device according to claim 4, wherein the pattern detection unit determines that the light reception pulse pattern matches the light emission pulse pattern when each bit of the digital signal stored in the shift register matches a corresponding bit of the light emission pulse pattern.

6. The photoelectric conversion device according to claim 5, wherein the pattern detection unit determines that the light reception pulse pattern does not match the light emission pulse pattern when at least one of the bits of the digital signal stored in the shift register does not match a corresponding bit of the light emission pulse pattern.

7. The photoelectric conversion device according to claim 1, wherein the photon detection element includes an avalanche photodiode and a recharging circuit configured to reset an output potential of the avalanche photodiode.

8. The photoelectric conversion device according to claim 7, wherein the recharging circuit periodically performs the reset.

9. The photoelectric conversion device according to claim 8, wherein a timing at which the recharging circuit performs the reset and a timing at which the pattern detection unit acquires one bit of the light reception pulse pattern are synchronized with each other.

10. The photoelectric conversion device according to claim 1 comprising a plurality of the photon detection elements, wherein the gating unit receives the light reception pulse signal from each of the plurality of photon detection elements.

11. The photoelectric conversion device according to claim 1, wherein the light emission pulse pattern includes two or more bits of digital signals.

12. The photoelectric conversion device according to claim 1, wherein the light emission pulse pattern includes identification information of the light source or the photoelectric conversion device.

13. The photoelectric conversion device according to claim 1, wherein the light emission pulse pattern includes information indicating an installation environment of the light source or the photoelectric conversion device.

14. The photoelectric conversion device according to claim 1, wherein the light emission pulse pattern includes a digital value that is randomly determined.

15. A ranging device comprising:

the photoelectric conversion device according to claim 1; and a signal processing unit configured to process a signal output from the photoelectric conversion device.

16. A movable body comprising:

the photoelectric conversion device according to claim 1;

a distance information acquisition unit configured to acquire distance information to an object from a signal output from the photoelectric conversion device; and a movable body control unit configured to control the movable body based on the distance information.

17. A photoelectric conversion device comprising:

a photon detection element configured to generate a light reception pulse signal according to incident light;

a control unit configured to control a light emission pulse pattern of a light source, a light emission timing of the light source, and a gating period with respect to the light emission timing;

a gating unit configured to output a light reception pulse pattern of the incident light based on the light reception pulse signal that is input in the gating period; and a pattern detection unit configured to compare the light reception pulse pattern with the light emission pulse pattern to output a signal according to a comparison result, wherein a length of the gating period is equal to or greater than a length of a duration of the light emission pulse pattern, wherein the pattern detection unit outputs a first signal indicating that light has been received when it is determined that the light reception pulse pattern matches the light emission pulse pattern, and wherein the pattern detection unit outputs a second signal indicating that light has not been received when it is determined that the light reception pulse pattern does not match the light emission pulse pattern.

18. A photoelectric conversion device comprising:

a photon detection element configured to generate a light reception pulse signal according to incident light;

a control unit configured to control a light emission pulse pattern of a light source, a light emission timing of the light source, and a gating period with respect to the light emission timing;

a gating unit configured to output a light reception pulse pattern of the incident light based on the light reception pulse signal that is input in the gating period; and a pattern detection unit configured to compare the light reception pulse pattern with the light emission pulse pattern to output a signal according to a comparison result, wherein a length of the gating period is equal to or greater than a length of a duration of the light emission pulse pattern, and wherein the gating unit includes a logic circuit configured to output a logical product of the light reception pulse signal and a gating signal indicating the gating period.

* * * * *